United States Patent [19]

Balukin et al.

[11] Patent Number: 5,500,799
[45] Date of Patent: Mar. 19, 1996

[54] METHOD OF OPERATING A LOCOMOTIVE MOUNTED THROTTLE CONTROLLER BETWEEN TWO MODES OF OPERATION INCLUDING A TRANSITION BETWEEN SUCH TWO MODES

[75] Inventors: Gregory S. Balukin; Daniel J. Wolf, both of Pittsburgh, Pa.

[73] Assignee: Westinghouse Air Brake Company, Wilmerding, Pa.

[21] Appl. No.: 340,237

[22] Filed: Nov. 16, 1994

[51] Int. Cl.$^6$ ................................................ B60L 15/20
[52] U.S. Cl. ................................................ 364/426.05
[58] Field of Search .................. 364/424.05, 426.01, 364/426.04, 426.05, 165, 153, 159; 361/90; 303/3; 105/61; 246/182, 248

[56] References Cited

U.S. PATENT DOCUMENTS

| | | | |
|---|---|---|---|
| 3,715,579 | 2/1973 | Eblovi | 246/187 A |
| 3,794,834 | 2/1974 | Auer et al. | 246/187 B |
| 3,805,056 | 4/1974 | Birkin | 246/187 B |
| 4,234,922 | 11/1980 | Wilde et al. | 246/182 R |
| 4,401,035 | 8/1983 | Spigarelli et al. | 105/61 |
| 4,479,177 | 10/1984 | Berti | 364/159 |
| 4,503,479 | 3/1985 | Otsuka et al. | 361/90 |
| 4,509,110 | 4/1985 | Levesque, Jr. et al. | 364/153 |
| 4,652,057 | 3/1987 | Engle et al. | 303/3 |
| 4,695,941 | 9/1987 | Kumar | 364/165 |
| 5,016,840 | 5/1991 | Bezos | 246/187 R |

*Primary Examiner*—Kevin J. Teska
*Assistant Examiner*—Dan Fiul
*Attorney, Agent, or Firm*—James Ray & Associates

[57] ABSTRACT

Method of operating an electronically controlled throttle controller between two modes of operation, including a transition between modes, includes powering up an electronics package and determining if a short term power out, a long term power out or a loss of CPU control in either short term or long term has occurred. The position of throttle, dynamic brake and reverser handles is compared with a previous mode of operation to determine current mode of operation. If it is determined that the throttle controller is in handle mode, the output signal to the trainlines is adjusted according to handle positions. Outputs of throttle, dynamic brake and reverser handles are set in the home position if an RMU command is received. A predetermined delay is imposed when outputs of the throttle, dynamic brake and reverser handles are in home position after positioning by an operator of the locomotive and before exiting a handle mode and entering an RMU mode of operation. If an RMU command is received by the throttle controller after the controller has exited from handle mode, then the output signals are adjusted to the trainlines.

20 Claims, 2 Drawing Sheets

5,500,799

METHOD OF OPERATING A LOCOMOTIVE MOUNTED THROTTLE CONTROLLER BETWEEN TWO MODES OF OPERATION INCLUDING A TRANSITION BETWEEN SUCH TWO MODES

CROSS REFERENCE TO RELATED APPLICATIONS

The invention taught in this patent application is closely related to the inventions taught in the following co-pending patent applications: Electronically Controlled Locomotive Throttle Controller Including Remote Multiple Unit Throttle Control; Method And Apparatus For Determining And Encoding The Position Of A Reverser Handle On A Locomotive Control Stand; Digital Output Control Device and Method For Operating; Method And Apparatus For Feedback Of Trainline Status To The Central Processor Of A Locomotive Throttle Controller; Apparatus For Interlocking Throttle, Dynamic Brake And Reverser Handles On A Control Stand Of A Railway Locomotive; Method Of Performing Diagnostics On An Electronically Controlled Railway Locomotive Throttle Controller; An Apparatus For And A Method Of Generating An Analog Signal For Control Of Dynamic Braking; An Apparatus For Feedback Of An Analog Signal Used To Monitor And/Or Control Dynamic Braking And Method Of Operating; An Apparatus To Enable Controlling A Throttle Controller From A Remote Host; Apparatus For Interlocking Reverser Handle On A Control Stand Of A Railway Locomotive; and, Apparatus For Determining The Absolute Position Of Throttle, Dynamic Brake And Reverser Handles On A Locomotive Control Stand. Each of the above-referenced patent applications are being filed concurrently herewith and are assigned to the assignee of this invention. Additionally, the teachings of each of these patent applications is incorporated herein by reference thereto.

FIELD OF THE INVENTION

The present invention relates, in general, to a locomotive mounted electronically operated throttle controller and, more particularly, this invention relates to a method of operating such locomotive mounted throttle controller between two modes of operation including a transition between such two modes of operation.

BACKGROUND OF THE INVENTION

As is recognized in the railway industry, prior to the present invention, the throttle controller assemblies which are used in a railway type locomotive are almost exclusively mechanical type throttle controllers. Such mechanical type throttle controller assemblies normally utilize a number of mechanical devices in order to achieve actuation of the necessary microswitches and/or contacts. It is quite well known, for example, that cams are used extensively in this application in order to achieve the required actuation of the various microswitches and/or contacts present in the mechanical type throttle controller.

Such mechanical type throttle controllers which are presently being used on railway locomotives have a number of relatively serious drawbacks and/or limitations. These limitations have become more pronounced as the length of freight trains has grown in modern railroading, because the use of more and more locomotives are now required in a train consist in order to pull and/or push the added loads being hauled. For example, these mechanical type throttle controllers utilize either microswitches or contacts to control the voltage that is being applied to the trainlines which control the locomotive engine throttle setting, reverse and dynamic braking. Furthermore, there is no provision in these prior art mechanical throttle controllers for possible shut down of the system in the event of an output over current.

Additionally, these mechanical type throttle controllers are not equipped to provide the operator of the locomotive with any important feedback information and, consequently, they may not recognize a potential failure situation. Throttle controllers of the mechanical type also utilize either a resistive type voltage divider or a high power potentiometer in order to control the voltage and they are not equipped for shutdown of voltage regulation.

The prior art mechanical throttle controllers provide labels over the mechanical handles to convey only the position of the handle to the locomotive operator. However, these mechanical throttle controllers are not equipped to display certain other relevant information such as various diagnostic information, status information and/or warning type messages.

Furthermore, in a situation where it is either desirable or necessary to provide the required throttle control from a remote host over the communication lines, the currently used mechanical type throttle controllers require that a number of additional relays be used.

It can be seen from the above discussion of the mechanical type throttle controller assemblies presently used in the railroad industry that there is an unfilled need which exists in the railroad industry for an improved railway locomotive type throttle controller assembly which will provide both enhanced performance capability, additional functions which are not possible to accomplish with the prior art mechanical type throttle controllers and more consistent reliability. This need has been addressed by the this invention and the additional inventions being filed concurrently herewith.

SUMMARY OF THE INVENTION

The present invention provides a method of operating an electronically controlled locomotive mounted throttle controller between two different modes of operation including a transition between such two modes of operation.

According to a first aspect of the present invention, such method includes the steps of powering up an electronics package and determining if one of a short term power out period, a long term power out period and a loss of CPU control in one of a short term and a long term has occurred. Then, determining the position of the throttle handle, the dynamic brake handle and the reverser handle disposed in such throttle controller and determining a previous mode of operation of such throttle controller in order to determine a current mode of operation of such throttle controller. Adjusting an output signal to the trainlines according to handles when it is determined that such throttle controller is operating in a handle mode. During adjusting such output signal, determining if an RMU command has been received by such throttle controller and positioning outputs of such throttle handle, such dynamic brake handle and such reverser handle to the home position when it is determined that a command has been received from such RMU. A predetermined delay is imposed when such outputs of such throttle handle, such dynamic brake handle and such reverser handle are in a home position after positioning of such throttle handle, such dynamic brake handle and such reverser handle into such home position by an operator of such locomotive and before exiting a handle mode and entering an RMU mode for operation of such throttle controller. After exiting such handle mode, determining if an RMU command was received by such throttle controller and adjusting such output signals to such trainlines when it is determined that an RMU command has been received by such throttle controller.

In a second aspect, the present invention provides a method of operating an electronically controlled locomotive mounted throttle controller between two different modes of operation including a transition between such two modes of operation which includes the steps of powering up an electronics package and determining if one of a short term power out period, a long term power out period and a loss of CPU control in one of a short term and a long term has occurred. Thereafter, determining the previous mode of operation of such throttle controller. Determining if at least one of the throttle handle, the dynamic brake handle and the reverser handle is not in a home position when it is determined from the previous mode of operation that such mode of operation of such throttle controller was in a handle mode thereby indicating that such output signal to trainlines should be in a home position. Positioning outputs of such throttle handle, such dynamic brake handle and such reverser handle to the home position when it is determined that such handles were not in their home position. Imposing a predetermined delay when such outputs of such throttle handle, such dynamic brake handle and such reverser handle are in a home position after positioning of such throttle handle, such dynamic brake handle and such reverser handle into such home position by an operator of such locomotive and before exiting a handle mode and entering an RMU mode for operation of such throttle controller. Further, determining if an RMU command was received by such throttle controller indicating an exit from such handle mode and then adjusting such output signals to such trainlines when it is determined that an RMU command has been received by such throttle controller.

OBJECTS OF THE INVENTION

It is, therefore, one of the primary objects of the present invention to provide a method of operating an electronically controlled locomotive mounted throttle controller between two different modes of operation, including a transition between such two modes, which is significantly more reliable than the operation of a manually controlled throttle controller.

Another object of the present invention is to provide a method of operating an electronically controlled locomotive mounted throttle controller between two different modes of operation which has a number of desirable safety interlocking features incorporated therein.

Still another object of the present invention is to provide a method of operating an electronically controlled locomotive mounted throttle controller between two different modes of operation which will prevent the trainlines on a train consist being energized on power-up of the throttle controller if the throttle and dynamic brake handles are not in their home position or until such handles have been moved to their home position for a predetermined length of time.

Yet another object of the present invention is to provide a method of operating an electronically controlled locomotive mounted throttle controller between two different modes of operation which requires the throttle handle and the dynamic brake handle to be in the home position before a transition can occur between modes of operation.

A further object of the present invention is to provide a method of operating an electronically controlled locomotive mounted throttle controller between two different modes of operation which will require a predetermine delay when changing from throttle (greater than idle) to dynamic brake (greater than off) in any mode of operation.

An additional object of the present invention is to provide a method of operating an electronically controlled locomotive mounted throttle controller between two different modes of operation in which the throttle controller will not accept an invalid command over a communication line from a remote multiple unit.

In addition to the specific objects and advantages of the invention which have been described above, various additional objects and advantages of the method of operating an electronically controlled locomotive mounted throttle controller between two different modes of operation including a transition between such two modes of operation will become more readily apparent to those persons who are skilled in the railway locomotive electronic control art from the following more detailed description of such invention, particularly, when such detailed description is taken in conjunction with the attached drawing Figure and with the appended claims.

BRIEF DESCRIPTION OF THE PRESENTLY PREFERRED EMBODIMENT OF THE INVENTION

Figure 1:
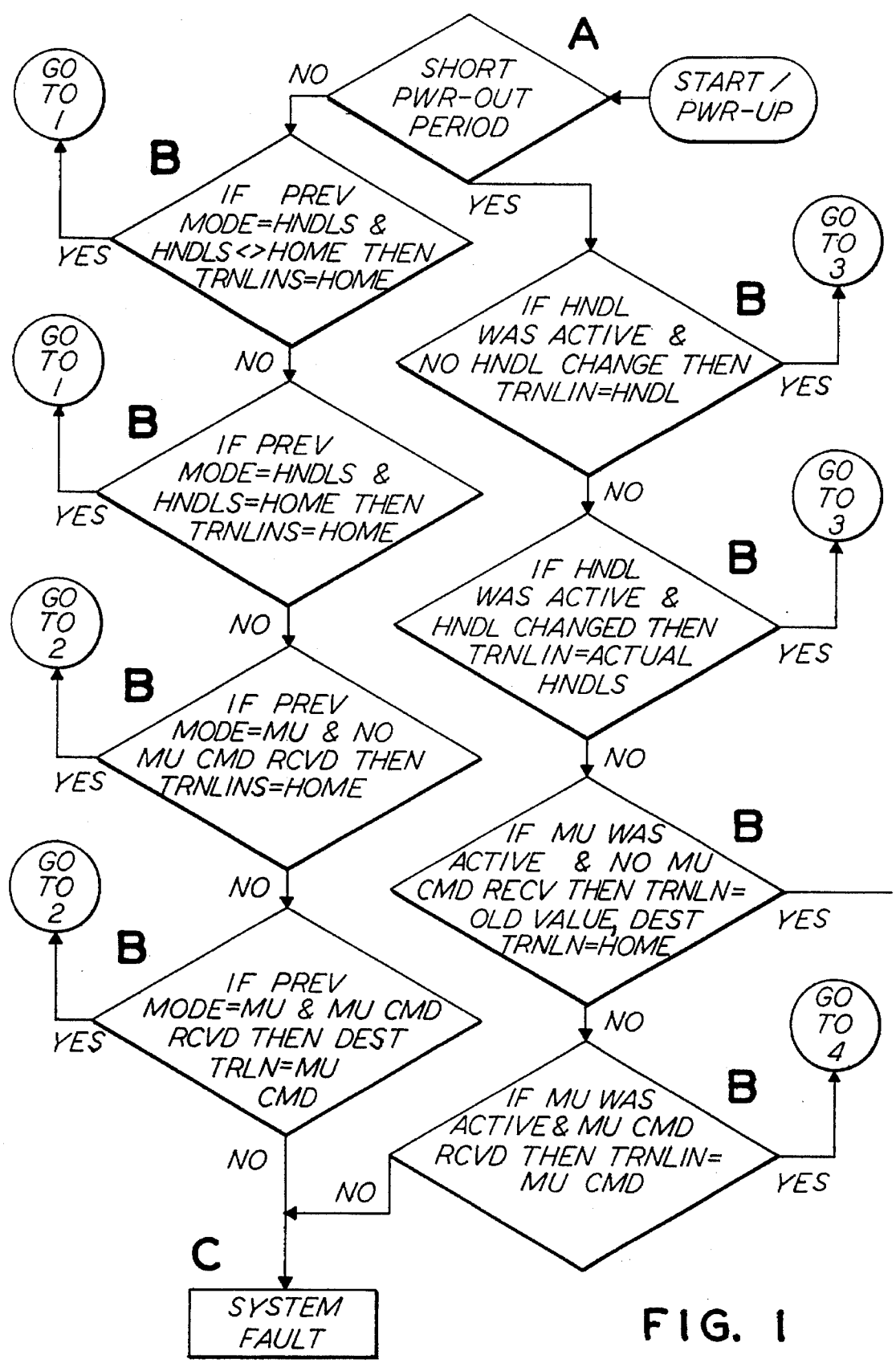
FIGS. 1 and 2 are schematic block diagrams of a presently preferred arrangement of the instant invention.
Figure 2:
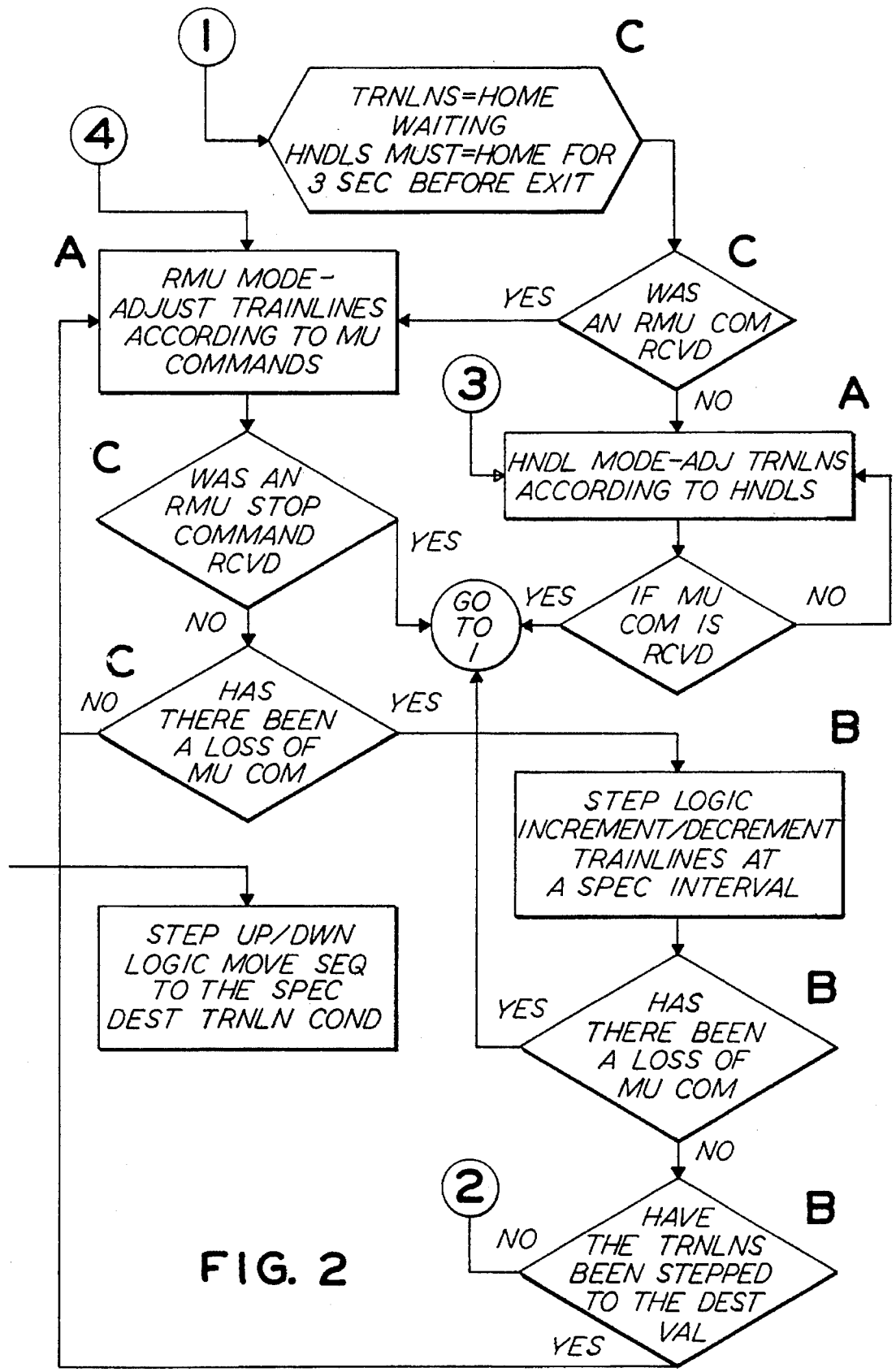

Prior to proceeding to a more detailed description of the invention it should be noted that as used in the specification and claims the following terms shall have the following meaning:

Short term power out shall mean a power loss of about two seconds or less:

Long term power loss shall mean a power loss of more than about two seconds;

RMU mode shall mean a remotely controlled throttle controller unit;

Home position shall mean throttle=idle; dynamic brake= off and reverser=neutral;

Handle mode shall mean such throttle controller is being operated by positioning of the throttle controller handles; and CPU shall mean central processing unit.

Reference is now made, more particularly, to the drawing Figures. Illustrated therein is a presently preferred arrangement for carrying out the various steps of the invention.

The invention, according to the first aspect, provides a method of operating an electronically controlled throttle controller, which is mounted on a railway locomotive, between two modes of operation. Such method includes a transitioning between such two modes. This method includes the steps of powering up an electronics package and then determining if one of a short term power out period, a long term power out period and a loss of CPU control had occurred. Such loss of CPU control may be either of a short term or a long term nature.

Thereafter, determining the position of each of the throttle handle, the dynamic brake handle and the reverser handle. Each of these handles is operatively connected to such throttle controller.

In this embodiment of the invention, a previous mode of operation of such throttle controller is then determined in order to determine the current mode of operation of such throttle controller. Thereafter, adjusting an output signal to trainlines according to handles when it is determined that such throttle controller is operating in a handle mode and then determining if an RMU command has been received by such throttle controller while adjusting such trainline output signal. Next, positioning the outputs of such throttle handle, such dynamic brake handle and such reverser handle to the home position when it is determined that a command has been received from such RMU.

A predetermined delay is imposed when such outputs of such throttle handle, such dynamic brake handle and such reverser handle are in a home position after positioning of such throttle handle, such dynamic brake handle and such reverser handle into the home position by an operator of such locomotive and before exiting a handle mode and entering an RMU mode for operation of such throttle controller.

Additionally, it is determined if an RMU command has been received by such throttle controller after exiting such handle mode and the output signals to such trainlines are adjusted when it is determined that an RMU command has been received by such throttle controller.

In the presently preferred embodiment, such method of operating an electronically controlled locomotive mounted throttle controller between two modes of operation, prior to determining if an RMU command has been received by such throttle controller, includes the additional step of adjusting such output signal to such trainlines according to a handle mode when it is determined that an RMU command has not been received by such throttle controller.

When it is determined that such throttle controller was operating in a handle mode and that such handles were changed then prior to adjusting the output signal to trainlines according to handles, such method includes the step of determining if such output signals to such trainline are substantially equal to the actual handle positions.

If it is determined that such output signals to the trainline are substantially equal to the actual handle positions, then, according to the invention it is permissible to adjust these output signals to the trainline in this mode of operation ,i.e., the handle mode.

The invented method of operating an electronically controlled locomotive mounted throttle controller between two modes of operation, also, provides that when it is determined that the output signals to such trainline are not substantially equal to the actual handle positions such method includes the additional steps of; first, determining that an RMU mode was active and no command was received by the throttle controller so that such output signal to the trainline was at an old value and destination of such output signal to the trainline equals the home position and second, moving sequentially to destination trainline condition prior to making a determination if one of a short term power outage period, a long term power outage period and a loss of CPU control in one of a short term and a long term had occurred.

However, if it is determined that such output signals to such trainline are not substantially equal to actual handle positions, then the method includes the additional steps of; first, making a determination that an RMU mode was active and that no command was received by such throttle controller so that the output signal to such trainline was at an old value and the destination of the output signal to such trainline does not equal the home position and second, determining that such RMU was active and that a command was received thereby indicating that such output signal to such trainline equals the RMU command and third, adjusting the output signals to such trainlines according to RMU commands.

On the other hand, when it is determined that such output signals to such trainline are not substantially equal to the actual handle positions, the method includes the additional steps of; first, determining that an RMU mode was active and that no command was received by such throttle controller so that the output signal to such trainline was at an old value and the destination of such output signal to the trainline does not equal the home position and second, determining that such RMU was active and that a command was received and that such output signal to the trainline does not equal the RMU command indicates a system fault.

According to another aspect of the present invention, a method of operating an electronically controlled locomotive mounted throttle controller between two modes of operation, including a transition between such two modes, is provided which includes the steps of powering up an electronics package and, like the method described above, determining if one of a short term power out period, a long term power out period and a loss of CPU control in one of a short term and a long term has occurred.

Thereafter, it is determined what the previous mode of operation of such throttle controller was. Also, it is determined if at least one of the throttle handle, the dynamic brake handle and the reverser handle is not in a home position when it is determined that such mode of operation of such throttle controller was in a handle mode thereby indicating that such output signal to trainlines should be in a home position. This method then provides for positioning outputs of such throttle handle, such dynamic brake handle and such reverser handle to the home position when it is determined that such handles were not in fact in a home position.

A predetermined delay is imposed on the system when such outputs of such throttle handle, such dynamic brake handle and such reverser handle are in a home position after the positioning of such throttle handle, such dynamic brake handle and such reverser handle into such home position by an operator of such locomotive and before exiting a handle mode and entering an RMU mode for operation of such throttle controller.

It is then determined if an RMU command was received by such throttle controller indicating an exit of the handle mode and then adjusting the output signals to such trainlines when it is determined that an RMU command has been received by such throttle controller.

In the presently preferred embodiment of the invention, such method of operating an electronically controlled locomotive mounted throttle controller between two modes of operation if it is determined that one of a short term power out period, a long term power out period and a loss of CPU control in one of a short term and a long term has not occurred and it was determined that such previous mode of operation of such throttle controller was in a handle mode, then the method includes the additional step of determining if the output signals to such trainlines equals such home position.

Such method includes returning to the step of imposing a predetermined delay when such outputs of such throttle handle, such dynamic brake handle and such reverser handle are in a home position and after positioning of such throttle handle, such dynamic brake handle and such reverser handle into this home position by an operator of such locomotive and before exiting a handle mode and entering an RMU mode for operation of such throttle controller when it is determined that the output signals to such trainlines equals the home position. Preferably, such delay imposed will be on the order of about three seconds.

When it is determined by the method that such output signals to the trainline are not equal to the home position then according to the method a determination is made of the previous mode of operation of such throttle controller. If such mode of operation was an RMU mode there were no RMU commands being received, then according to the invention such method includes the additional step of positioning the output signals to such trainlines into a position equaling the home position.

Accordingly, when it is determined that if a previous mode of operation of such throttle controller was in an RMU mode with no RMU commands being received, then such method includes the step of one of incrementing and decrementing from a current value to a destination value of such trainlines at a specific predetermined interval. The presently preferred interval is about one step per second.

In the presently preferred embodiment of the invention, such method includes the step of one of determining if a previous mode of operation was RMU and that an RMU command was received and then determining if destination trainline equals such RMU command. In this case, such method includes the step of one of incrementing and decrementing such trainlines at such specific predetermined interval.

The method of operating an electronically controlled locomotive mounted throttle controller between two modes of operation, will preferably, when it is determined that one of such previous mode of operation equals handle and no RMU command was received the method includes the step of indicating a system fault. Such RMU command preferably is issued from an electronically controlled brake unit.

The method also includes the desirable step of determining if there has been a loss of RMU communications and when it is determined that a loss of such RMU communications has not occurred the method includes the additional step of one of incrementing and decrementing such trainlines at such specific predetermined interval until said destination trainline equals said RMU command.

Although a presently preferred and a number of alternative embodiments of the present invention have been described in detail above with particular reference to the drawing Figure, it should be understood that various additional adaptations and modifications of the inventive method of operating an electronically controlled locomotive mounted throttle controller between two different modes of operation, including a transition between such two modes of operation, can be made by those persons who are skilled in the railroad electronics control art without departing from the spirit and/or scope of the invention as defined by the appended claims.

I claim:

1. A method of operating an electronically controlled locomotive mounted throttle controller between a first handle mode of operation, and a second RMU mode of operation, including a transition between such first handle mode and such second RMU mode, said method comprising the steps of:

(a) powering up an electronics package;
 (b) determining if one of a short term power outage period, a long term power outage period and a loss of CPU control in one of a short term and a long term had occurred;
 (c) determining, after step (b), position of throttle handle, dynamic brake handle and reverser handle operatively connected to such throttle controller;
 (d) distinguishing a previous mode of operation of such throttle controller between said first handle mode of operation and said second RMU mode of operation; in order to determine a current mode of operation of such throttle controller;
 (e) adjusting an output signal to trainlines according to handles when it is determined, in step (d) that such throttle controller is operating in said first handle mode of operation;
 (f) determining if an RMU command has been received by such throttle controller, during step (e);
 (g) positioning outputs of such throttle handle, such dynamic brake handle and such reverser handle to home position when it is determined in step (f) that a command has been received from such RMU;
 (h) imposing a predetermined delay when such outputs of such throttle handle, such dynamic brake handle and such reverser handle are in a home position, in step (g), after positioning of such throttle handle, such dynamic brake handle and such reverser handle into said home position by an operator of such locomotive and before exiting a first handle mode and entering a second RMU mode for operation of such throttle controller;
 (i) determining if an RMU command was received by such throttle controller after exiting said first handle mode; and
 (j) adjusting said output signals to such trainlines when it is determined, in step (i), that an RMU command has been received by such throttle controller.

2. A method of operating an electronically controlled locomotive mounted throttle controller between two modes of operation, according to claim 1, wherein said method, prior to step (f), includes the additional step of adjusting said output signal to such trainlines according to a handle mode when it is determined, in step (e), that said RMU command has not been received by such throttle controller.

3. A method of operating an electronically controlled locomotive mounted throttle controller between two modes of operation, according to claim 2, wherein, during step (d), it is determined that such throttle controller was operating in a handle mode and that such handles were changed then, prior to step (e), said method includes the additional step of determining if said output signals to such trainline are substantially equal to actual handle positions.

4. A method of operating an electronically controlled locomotive mounted throttle controller between two modes of operation, according to claim 3, wherein it is determined that said output signals to such trainline are substantially equal to actual handle positions thereby enabling proceeding to step (e).

5. A method of operating an electronically controlled locomotive mounted throttle controller between two modes of operation, according to claim 3, wherein it is determined that said output signals to such trainline are not substantially equal to actual handle positions and said method includes the additional steps of; first, determining that an RMU mode was active and no command was received by said throttle controller so that said output signal to said trainline was at an old value and destination of said output signal to said trainline equals home position and second, moving sequentially to destination trainline condition prior to proceeding to step (b).

6. A method of operating an electronically controlled locomotive mounted throttle controller between two modes of operation, according to claim 3, wherein it is determined that said output signals to such trainline are not substantially equal to actual handle positions and said method includes the additional steps of; first, determining that an RMU mode was active and no command was received by said throttle controller so that said output signal to said trainline was at an old value and destination of said output signal to said trainline does not equal home position and second, determining that said RMU was active and said command was received thereby indicating that said output signal to said trainline equals RMU command and third, adjusting said output signals to said trainlines according to RMU commands.

7. A method of operating an electronically controlled locomotive mounted throttle controller between two modes of operation, according to claim 3, wherein it is determined that said output signals to such trainline are not substantially equal to actual handle positions and said method includes the additional steps of; first, determining that an RMU mode was active and no command was received by said throttle controller so that said output signal to said trainline was at an old value and destination of said output signal to said trainline does not equal home position and second, determining that said RMU was active and said command was received and that said output signal to said trainline does not equal RMU command thereby indicating a system fault.

8. A method of operating an electronically controlled locomotive mounted throttle controller between a first handle mode of operation, and a second RMU mode of operation, including a transition between such first handle mode and such second RMU mode, said method comprising the steps of:

(a) powering up an electronics package;

(b) determining if one of a short term power out period, a long term power out period and a loss of CPU control in one of a short term and a long term had occurred;

(c) determining previous mode of operation of such throttle controller, between said first handle mode of operation and said second RMU mode of operation;

(d) determining if at least one of throttle handle, dynamic brake handle and reverser handle is not in a home position when it is determined, in step (c), that said mode of operation of such throttle controller was in said first handle mode thereby indicating that such output signal to trainlines should be in a home position;

(e) positioning outputs of such throttle handle, such dynamic brake handle and such reverser handle to home position when it is determined, in step (d), that said handles were not in a home position;

(f) imposing a predetermined delay when such outputs of such throttle handle, such dynamic brake handle and such reverser handle are in a home position, in step (e), after positioning of such throttle handle, such dynamic brake handle and such reverser handle into said home position by an operator of such locomotive and before existing said first handle mode and entering said second RMU mode for operation of such throttle controller;

(g) determining if an RMU command was received by such throttle controller indicating an exit of said first handle mode; and (h) adjusting said output signals to such trainlines when it is determined, in step (g), that an RMU command has been received by such throttle controller.

9. A method of operating an electronically controlled locomotive mounted throttle controller between two modes of operation, according to claim 8, wherein in step (b) it was determined that one of a short term power out period, a long term power out period and a loss of CPU control in one of a short term and a long term had not occurred and in step (c) it was determined that said previous mode of operation of such throttle controller was in a handle mode, said method includes the additional step of determining if said output signals to such trainlines equals said home position.

10. A method of operating an electronically controlled locomotive mounted throttle controller between two modes of operation, according to claim 9, wherein said method includes returning to step (f) when it is determined that said output signals to such trainlines equals said home position.

11. A method of operating an electronically controlled locomotive mounted throttle controller between two modes of operation, according to claim 9, wherein when it is determined that said output signals to such trainline do not equal said home position said method includes the additional step of determining if a previous mode of operation of such throttle controller was in an RMU mode with no RMU commands being received, said method includes the additional step of positioning said output signals to such trainlines in a position equaling said home position.

12. A method of operating an electronically controlled locomotive mounted throttle controller between two modes of operation, according to claim 11, wherein when it is determined that if a previous mode of operation of such throttle controller was in an RMU mode with no RMU commands being received, then said method includes the step of one of incrementing and decrementing such trainlines at a specific predetermined interval.

13. A method of operating an electronically controlled locomotive mounted throttle controller between two modes of operation, according to claim 11, wherein said method includes the step of one of determining if a previous mode of operation was RMU and that an RMU command was received then making destination trainline equal said RMU command, said method includes the additional step of one of incrementing and decrementing such trainlines at a specific predetermined interval.

14. A method of operating an electronically controlled locomotive mounted throttle controller between two modes of operation, according to claim 13, wherein when it is determined that one of said previous mode of operation equals handle and no RMU command was received then said method includes the additional step of indicating a system fault.

15. A method of operating an electronically controlled locomotive mounted throttle controller between two modes of operation, according to claim 13, wherein said specific predetermined interval is at about one step per second.

16. A method of operating an electronically controlled locomotive mounted throttle controller between two modes of operation, according to claim 15, wherein said method includes the additional steps of positioning outputs of such throttle handle, such dynamic brake handle and such reverser handle to home position and imposing a predetermined delay when such outputs of such throttle handler such dynamic brake handle and such reverser handle are in a home position after positioning of such throttle handle, such dynamic brake handle and such reverser handle into said home position by an operator of such locomotive and before exiting a handle mode and entering an RMU mode for operation of such throttle controller when there has been a loss of RMU communications.

17. A method of operating an electronically controlled locomotive mounted throttle controller between two modes of operation, according to claim 16, wherein when it is determined that a loss of RMU communications has not occurred the method includes the additional step of one of said incrementing and decrementing such trainlines at said specific predetermined interval until said destination trainline equals said RMU command.

18. A method of operating an electronically controlled locomotive mounted throttle controller between two modes of operation, according to claim 16, wherein when it is determined that there has been a loss of RMU communications said method includes the additional step of returning to the step of one of incrementing and decrementing such trainlines at a specific predetermined interval.

19. A method of operating an electronically controlled locomotive mounted throttle controller between two modes of operation, according to claim 9, wherein said predetermined delay imposed in step (f) is at least about three seconds.

20. A method of operating an electronically controlled locomotive mounted throttle controller between two modes of operation, according to claim 9, wherein said RMU command is issued by an external host computer.

* * * * *

UNITED STATES PATENT AND TRADEMARK OFFICE
CERTIFICATE OF CORRECTION

PATENT NO. : 5,500,799
DATED : March 19, 1996
INVENTOR(S) : Gregory S. Balukin et al.

It is certified that error appears in the above-indentified patent and that said Letters Patent is hereby corrected as shown below:

Column 2, line 36, after by, delete "the".

Column 4, line 6, delete "predetermine" and insert —predetermined—.

Column 9, line 63, delete "existing" and insert —exiting—.

Column 10, line 63, delete "handler" and insert —handle—;

column 10, line 63, after handler insert a comma.

Signed and Sealed this

Thirtieth Day of July, 1996

Attest:

BRUCE LEHMAN

*Attesting Officer*     *Commissioner of Patents and Trademarks*